Figure 1:
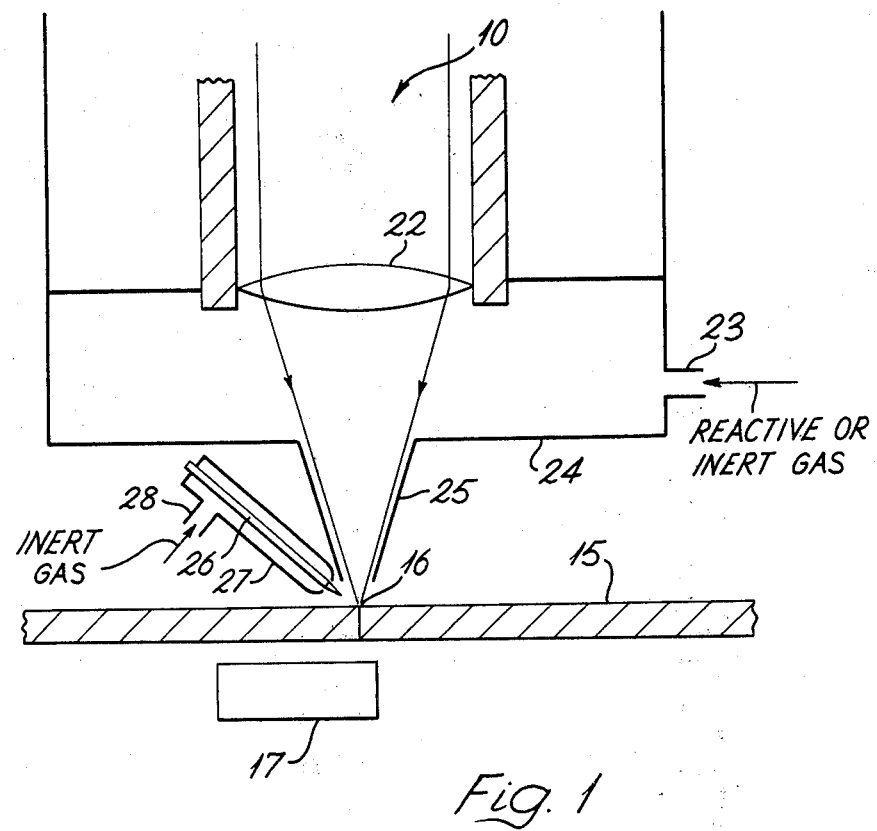

United States Patent [19]

Steen et al.

[11] 4,390,774
[45] Jun. 28, 1983

[54] METHOD AND APPARATUS FOR TREATING ELECTRICALLY NON-CONDUCTIVE WORKPIECES

[75] Inventors: William M. Steen, New Maldon, England; Walter W. Duley, King City, Canada

[73] Assignee: National Research Development Corporation, London, England

[21] Appl. No.: 247,112

[22] Filed: Mar. 24, 1981

[30] Foreign Application Priority Data

Mar. 25, 1980 [GB] United Kingdom ................. 8009981

[51] Int. Cl.³ .............................................. B23K 27/00
[52] U.S. Cl. ........................... 219/121 FS; 219/121 L; 219/121 LC; 219/121 LG; 219/121 LK; 219/121 LM
[58] Field of Search ................. 219/121 LC, 121 LD, 219/121 LG, 121 LH, 121 LJ, 121 LN, 121 FS, 121 L, 121 LM, 121 LA, 121 LB

[56] References Cited

U.S. PATENT DOCUMENTS

| 3,569,660 | 3/1971 | Houldcroft | 219/121 LH |
| 4,167,662 | 9/1979 | Steen | 219/121 L |
| 4,322,601 | 3/1982 | Serlin | 219/121 LE |

FOREIGN PATENT DOCUMENTS

| 1547172 | 6/1979 | United Kingdom . |
| 2045669 | 11/1980 | United Kingdom . |
| 1600796 | 10/1981 | United Kingdom . |

OTHER PUBLICATIONS

Steen and Eboo "Arc Augmented Laser Welding" Metal Construction, Jul. 1979, pp. 332, 333 and 335.

*Primary Examiner*—C. L. Albritton
*Attorney, Agent, or Firm*—Cushman, Darby & Cushman

[57] ABSTRACT

Non-conductive workpieces present a problem where laser treatment of a workpiece is to be augmented by the application of an arc, since the arc cannot be struck to the workpiece. In the present invention a laser beam is augmented by an arc struck between two electrodes typically on opposite sides of the workpiece. The arc usually either penetrates the workpiece, or two arcs are formed on respective sides of the workpiece.

22 Claims, 2 Drawing Figures

METHOD AND APPARATUS FOR TREATING ELECTRICALLY NON-CONDUCTIVE WORKPIECES

The present invention relates to methods and apparatus for treating non-electrically conducting workpieces using a laser.

The term "treating" in this specification includes cutting, welding, drilling, surface hardening, surface alloying and thermally treating, and the word "workpiece", particularly in welding, includes the plural.

U.K. Pat. No. 1,547,172 and U.S. Pat. No. 4,167,662 explain that methods formerly employed for treating a workpiece using a laser do not reach the potential performance indicated by linear extrapolation from low power work. The above mentioned specifications then disclose an invention in which an arc is struck between an electrode and a heat affected zone created in the workpiece by projecting a laser beam onto the workpiece.

According to a first aspect of the present invention there is provided a method for treating a workpiece comprising projecting a beam of light from a laser onto a workpiece formed from non-conductive material, and applying a voltage between at least two electrodes to strike an arc, the electrodes being so positioned that the arc impinges on the workpiece within a heat affected zone created by the laser beam in the workpiece.

In this specification and claims the term "non-conductive material" includes all materials which are not generally classed as conductors and thus, for example, the term includes semiconductors in addition to insulators.

The heat affected zone is that zone of the workpiece which is raised to a comparatively high temperature by energy from the laser.

Conveniently the workpiece may be interposed between the, or at least two of, the electrodes.

Preferably the arc extends through the workpiece; for example during cutting the arc may extend through the cut and during welding the arc may extend through the gap between the unwelded portions of the workpiece adjacent to the point where welding is taking place. If the workpiece is thin and/or porous, for example paper or cloth, the arc may extend through small holes in the workpiece.

Alternatively, first and second arcs may extend from a first electrode to the workpiece and from the workpiece to a second electrode, respectively, or a single arc may extend from one electrode to the workpiece. The single arc may be on the same side of the workpiece as the laser beam or when the heat affected zone extends through the workpiece to an opposite surface thereof, the single arc may extend from the said opposite surface to one of the electrodes.

The main advantage of the present invention is that the arc travels preferentially down a plasma induced by the laser to the heat affected zone and the workpiece burns in a controlled way or increases in electrical conductivity with temperature as in the cutting of glass or paper. In either case heat, useful in the heat treating process is transferred from the arc to the workpiece and hence the heat provided by the laser beam is augmented. The methods and apparatus of the above mentioned specifications are therefore modified in a way which allows a non-conductive workpiece to be treated even though the material of the workpiece cannot, due to its inability to conduct well, be effectively connected in the circuit applying the arc. For example the workpiece could not be effectively connected to earth.

Another advantage is that the additional power supplied to the non-conductive workpiece is expected, for welding, to result in a weld with a narrow heat affected zone and a large depth to width ratio indicating high penetration.

Preferably a jet of gas from a nozzle is also projected at the said heat affected zone; the gas may be inert or may react with either the workpiece, the electrode (for welding) or a flux.

As indicated above the invention may be used, for example, in cutting glass and paper, and cloth, card, leather, plastics, ceramics and semiconductors may also be cut. Other applications include welding glass and plastic, vulcanizing rubber and thermally setting resins.

The method of the invention may include so causing relative movement between the said zone and the workpiece, while maintaining the arc or arcs between one of the electrodes and the workpiece, that the treatment is carried out as required.

For surface alloying the method according to the invention may include applying material, to be alloyed with a portion of the surface of the workpiece, to the said portion and at the same time, or after, so causing relative movement between the said zone and the workpiece that the said zone visits every point in the area to be surface alloyed.

A multi-phase supply may be used to cause arcing and if so more than two electrodes may be used. For example in a three phase arrangement, three electrodes connected to line voltages may be positioned on one side of the workpiece with another electrode connected to neutral positioned on the other side.

According to a second aspect of the present invention there is provided apparatus for treating a workpiece comprising means for projecting a laser beam on to a workpiece, at least first and second electrodes spaced apart from one another, and means for applying a voltage between the electrodes to strike an arc which, in operation, impinges on the workpiece at a point within a heat affected zone created by the laser beam in the workpiece.

Preferably, in operation, the arc extends through the workpiece from one electrode to the other electrode, the arc either passing through a cut or gap in the workpiece or penetrating the workpiece material.

Apparatus according to the invention my include means for causing relative movement between the said zone and the workpiece while maintaining the arc between one of the electrodes and the said zone.

The apparatus may include means for projecting either a jet of gas from a nozzle towards the heat affected zone from a position opposite one workpiece surface which receives the laser beam or from a position opposite another workpiece surface, or projecting jets of gas from first and second nozzles towards the heat affected zone from positions opposite the said one and the said other workpiece surfaces respectively.

The gas may be exothermically reactive with the expected workpiece and/or flux expected to be applied to the workpiece.

The apparatus may include means for deflecting away from the laser beam at least part of the plume of gaseous materials and/or particles which is emitted from the point of incidence of the laser beam on the workpiece.

In the method and apparatus of the invention to electrodes, or one of the electrodes, may be positioned nearest the workpiece at a point in the workpiece where treatment is just about to take place.

Figure 2:
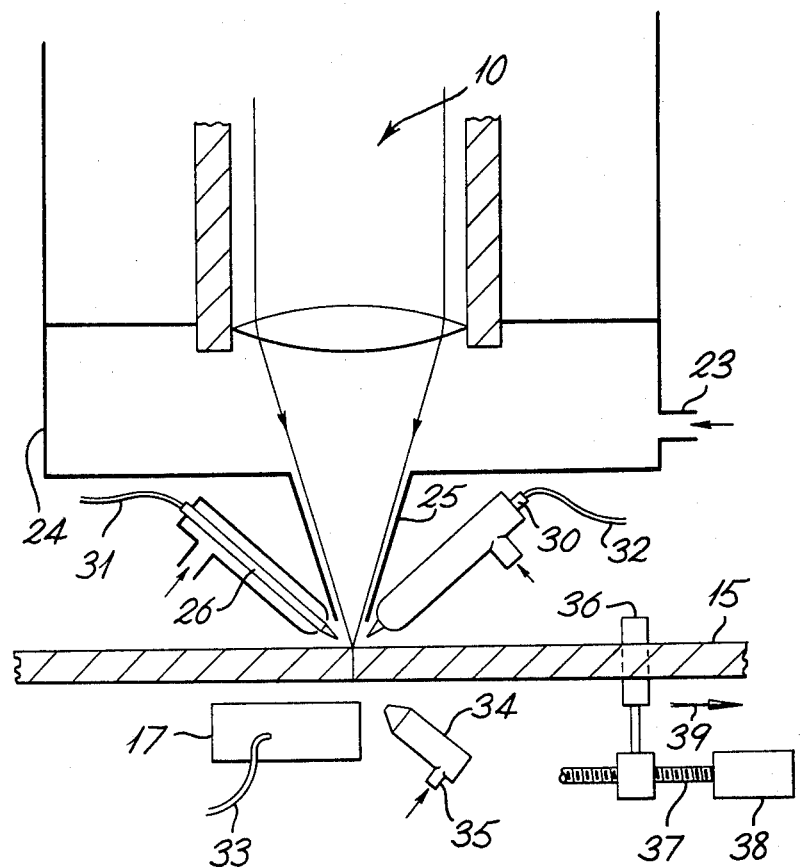

Certain embodiments of the invention will now be described, by way of example, with reference to the accompanying drawings, in which:

FIG. 1 shows a first apparatus according to the invention and illustrates the method of the invention, and FIG. 2 shows a second apparatus according to the invention which also illustrates the method.

An arrangement for welding or cutting using an inert gas, or a reactive gas, such as oxygen or chlorine, which takes part in an exothermic reaction is shown in FIG. 1. A laser beam 10 is focussed at a point 16 on a workpiece 15 by means of a lens 22. The workpiece 15 is made of non-electrically conducting material and since the figure is intended to show a general arrangement, the workpiece is not shown, for example as being partially cut or as made up of two portions being welded, rather its position and general form only are shown.

The inert gas used for welding or the reactive gas used for cutting passes through an inlet 23 into a housing 24 having a nozzle 25 which is, in operation, just above the point 14.

A first electrode 17, for example a block of graphite or tungsten and usually connected as an anode, is positioned on the opposite side of the workpiece from the laser beam. In addition a further electrode 26, usually connected as a cathode, is positioned on the opposite side of the workpiece from the electrode 17 and is shielded by an inert gas directed by gas shield 27 having an inlet 28.

A voltage is applied between the electrodes 17 and 26 to strike an arc between these electrodes through a cut or gap in the workpiece. For example if the workpiece is being cut the arc passes through the cut adjacent to the point at which cutting is taking place. Similarly if the workipece is being welded the arc passes through the gap between the unwelded portions of the workpiece adjacent to the point at which welding is taking place. In this way heat is transferred from the arc to the workpiece to assist cutting, for example by means of charring, or welding. There are thus two or three sources of heat for use in heat treatment; the laser beam, the reaction between the reactive gas (when used) and the workpiece, and the arc struck between the electrodes.

In other modes of operation the arc may penetrate the workpiece without forming a cut, for example if a paper or cloth workpiece is being treated the arc may penetrate minute perforations in the workpiece without cutting the workpiece in two. The arc may also extend from the electrode 26 to the workpiece and then a separate arc may exist from the workpiece to the electrode 17 and it is also possible that only one of these arcs may be present during treatment, depending on the relative distances between electrode 17 and the workpiece and between the electrode 26 and the workpiece.

In FIG. 2 the same components are used as in FIG. 1 but an additional electrode 30 which is shielded by inert gas in the same way as the electrode 26 is provided. This electrode can be used with the electrode 26 and a further electrode (not shown) for working from a three phase supply. The electrodes 26 and 30 are connected to respective line terminals of the supply by way of conductors 31 and 32 and the further electrode is connected to the other line terminal. A connection 33 connects the electrode 17 to the neutral of the three phase supply.

A further nozzle 34 with an inlet 35 for reactive or inert gas projects gas towards the heat affected zone on the opposite side of the workpiece 15 from the laser beam 10.

A schematic indication of means for moving the workpiece relative to the laser beam is shown in the form of a clamp 36, a lead screw 37 and an electric motor 38. The workpiece may for example move in the direction of the arrow 39 while being cut or welded so that the electrode 26 is nearest to the workpiece where treatment is about to take place. The arc from this electrode therefore prepares the next part of the workpiece to be treated. In order to allow the laser beam to reach the workpiece more easily, a further gas nozzle, or one of the nozzles shown, may be used to blow the plume of gaseous materials and/or particles which forms above the point at which treatment occurs.

While one embodiment of the invention has been specifically described it will be realised that the invention may be put into effect in many other ways, for example using apparatus based on the disclosures of the above mentioned specifications but modified according to the invention. Many of these modifications have been indicated above. It will be realised that, particularly in some modes of operation mentioned above, there are limitations on the size and type of workpiece which can be used. Clearly the workpiece must not be too thick and the applied voltage must be sufficient for striking the required arc. However these limitations can be resolved by simple test procedures.

We claim:

1. A method for treating a workpiece comprising projecting a beam of light from a laser onto a workpiece formed from non-conductive material and applying a voltage between at least two electrodes, each distinct from said workpiece to strike an arc, the electrodes being so positioned that the arc impinges on the workpiece within a heat affected zone created by the laser beam in the workpiece.

2. A method according to claim 1 wherein the workpiece is interposed between at least two of the electrodes.

3. A method according to claim 2 wherein the arc extends through the workpiece.

4. A method according to claim 1 wherein the arc extends from a first of the electrodes to the workpiece and a further arc extends from the workpiece to a second of the electrodes.

5. A method according to claim 1 wherein gas is projected towards the said heat affected zone.

6. A method according to claim 5 wherein the gas reacts with the workpiece.

7. A method according to claim 1 including so causing relative movement between the said zone and the workpiece while maintaining the arc that the treatment is carried out as required.

8. A method according to claim 1 for surface alloying, the workpiece including
applying material, to be alloyed with a portion of the surface of the workpiece, to the said portion and
so causing relative movement between the said zone and the workpiece that the said zone visits every point in the area to be surface alloyed.

9. A method according to claim 1 employing a plurality of arcs wherein a multi-phase electrical supply is used to strike the said arcs.

10. A method according to claim 7 wherein at least one of the electrtodes is positioned nearest the workpiece at a point in the workpiece where treatment is just about to take place.

11. Apparatus for treating a workpiece comprising
means for projecting a laser beam on to a workpiece,
at least first and second electrodes, each distinct from the workpiece and spaced apart from one another, and
means for applying a voltage between the electrodes to strike an arc which, in operation, impinges on the workpiece at a point within a heat affected zone created by the laser beam in the workpiece.

12. Apparatus according to claim 11 wherein, in operation, the arc extends through the workpiece from one electrode to the other electrode, the arc passing through the workpiece material.

13. Apparatus according to claim 11 including means for causing relative movement between the said zone and the workpiece while maintaining the arc between one of the electrodes and the said zone.

14. Apparatus according to claim 13 wherein at least one of the electrodes is so positioned that, in operation, the distance between the workpiece and the said electrode is a minimum at a point where treatment is just about to take place.

15. Apparatus according to claim 11 including means for projecting gas towards the heat affected zone.

16. Apparatus according to claim 15 wherein the means for projecting gas does so from a position opposite one workpiece surface which receives the laser beam or from a position opposite another workpiece surface.

17. Apparatus according to claim 15 wherein the means for projecting gas does so from a first position opposite one workpiece surface which receives the laser beam and from a second position opposite another workpiece surface.

18. Apparatus according to claim 15 wherein the gas is exothermically reactive with at least one workpiece material.

19. Apparatus according to claim 11 including means for deflecting away from the laser beam at least part of the plume of materials which is emitted from the point of incidence of the laser beam on the workpiece.

20. Apparatus according to claim 11 constructed for operation from a multi-phase electrical supply, wherein the first electrode is arranged for connection to one phase, and at least one other electrode (which may be the second electrode) is arranged for connection to another phase.

21. Apparatus according to claim 20 wherein one electrode is arranged for connection to the neutral of a multi-phase supply.

22. A method according to claim 5 including applying a flux which reacts with the gas at the heat affected zone.

* * * * *